United States Patent [19]
del Castillo

[11] 3,803,971
[45] Apr. 16, 1974

[54] LIGHTED OPTICAL METRONOME

[76] Inventor: Juan M. del Castillo, Risco 119, Mexico 20, D. F., Mexico

[22] Filed: Sept. 6, 1973

[21] Appl. No.: 394,795

[52] U.S. Cl. .................... 84/484, 35/35 B, 40/356
[51] Int. Cl. ........................................... G10b 15/00
[58] Field of Search ............ 84/484; 35/35 B, 35 G, 35/39; 40/341, 352, 356

[56] References Cited
UNITED STATES PATENTS

| | | | |
|---|---|---|---|
| 2,188,210 | 1/1940 | Smith | 35/35 B |
| 2,483,570 | 10/1949 | Bergey | 84/484 |
| 2,782,528 | 2/1957 | Wastl | 35/35 B |
| 3,595,122 | 7/1971 | Brediceanu | 84/484 |
| 3,743,758 | 7/1973 | del Castillo | 84/484 |

Primary Examiner—Lawrence R. Franklin

[57] ABSTRACT

A device to aid in the depicting of the proper tempo for the playing of a sheet of music utilizing an endless opaque belt having vertical transparent bar lines lighted from behind with a sheet of music on translucent paper placed in front of the belt.

7 Claims, 3 Drawing Figures

PATENTED APR 16 1974 3,803,971
FIG. 1.
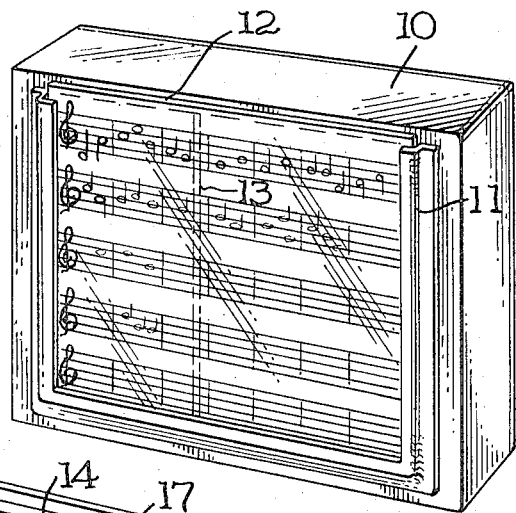
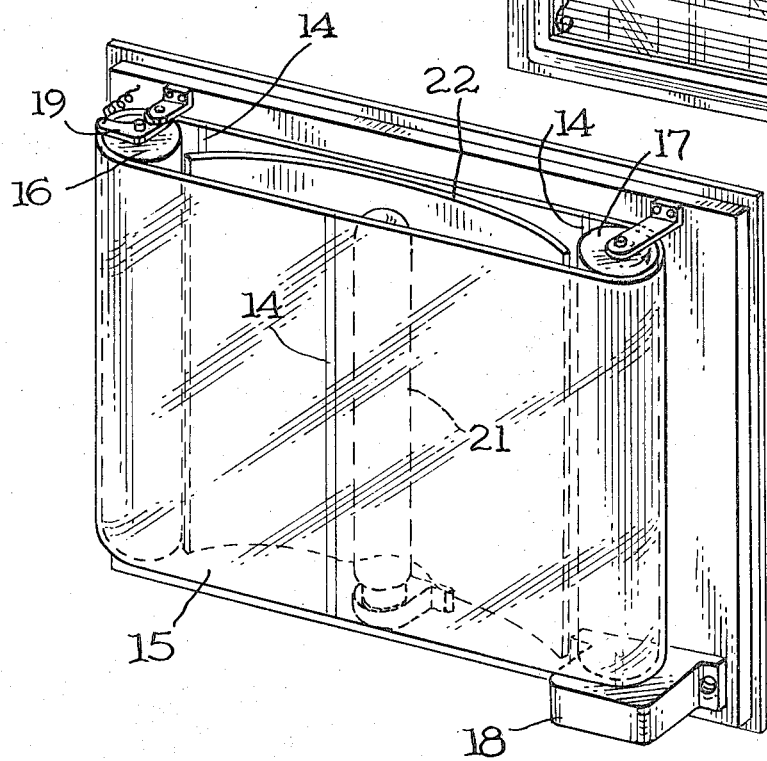
FIG. 2.
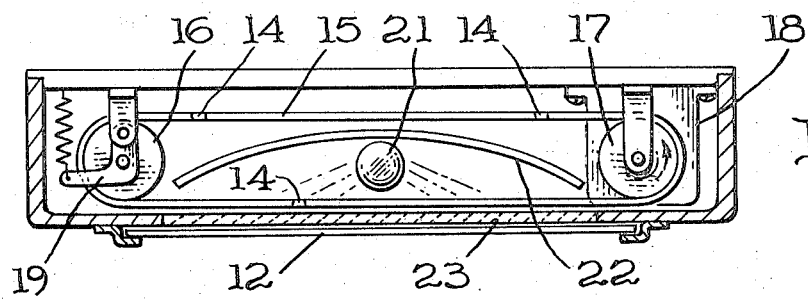
FIG. 3.

LIGHTED OPTICAL METRONOME

BACKGROUND OF THE INVENTION

The present invention relates to a device used to aid in the depicting of the proper tempo in playing music on a musical instrument from a sheet of music, and in particular relates to an optical means for such depicting of the tempo. Such a device is classed as an optical metronome and has for its object to draw the attention and keep the attention of the student on the note being played since this bright line will always be the brightest portion on the sheet of music.

SUMMARY OF THE INVENTION

The present invention is directed to an optical metronome wherein the tempo is designated by a moving transparent line on a continuous opaque belt moved between two rollers in a timed relationship to a sheet of music placed in front of said belt.

A further object of the present invention is to have light shine through said transparent bar lines in the opaque belt by means of a lamp placed behind one run of said belt.

A further object of the invention is to allow the viewing of the transparent lighted line through a sheet of music which for such purpose is on translucent paper or similar material.

BRIEF DESCRIPTION OF THE DRAWINGS

A complete understanding of the invention may be had from the following description of the particular embodiment of the invention. In the description, reference is made to the accompanying drawings of which:

FIG. 1 is the optical metronome as enclosed in a case and in use;

FIG. 2 is an enlarged view of the device of FIG. 1 with the front and side casing removed; and FIG. 3 is a top plan view of the device shown in FIGS. 1 and 2 with the casing shown and only the top side removed.

DESCRIPTION OF THE PREFERRED EMBODIMENT

Referring first to FIG. 1, there is shown the device of the present invention which is to be used as an aid in depicting the proper tempo for the playing of a sheet of music. In this figure, the outer casing 10 is shown having a bracket 11 extending along the bottom and up the sides of the front section of case 10. A sheet 12 of translucent paper material with music written thereon is slid into bracket 11 from the top. A lighted vertical line 13 shows through sheet 12 and moves along sheet 12 timed to the proper tempo for playing the music depicted thereon.

As shown in FIG. 2, this lighted line 13 is formed by means of a transparent bar line 14 which is one of several such vertical transparent portions on opaque belt 15 which is suspended between rollers 16 and 17. Roller 17 is the drive roller and is connected to motor 18 which may be controlled through electrical or mechanical means (not shown) to determine the speed of movement of the belt 15. Roller 16 is an idler roller and keeps the proper tension on opaque belt 15 by means of tension spring pivoted member 19. A lamp 21 with a reflector 22 behind it is mounted behind the first or front run of opaque belt 15 and thereby supplies the light source for the bright line 13 showing through translucent sheet 12.

To complete case 10 and keep dirt out of the mechanism of the present device a transparent window 23 is mounted in the front of case 10 behind the sheet of music 12.

The transparent portions 14 are spaced on opaque belt 15 the proper distance so that whatever the speed of motor 18 and rollers 17 and 16, only one bright line 13 will appear through transparent window 23 and translucent sheet 12. The spacing is also such that as soon as a bright line 13 has disappeared at the right hand side of sheet 12 another bright line 13 will appear among the notes at the left hand side of sheet 12 in proper time to play the music in the next row below without a break in the tempo.

It will be obvious to those skilled in the art that various changes may be made without departing from the scope of the invention and the invention is not to be considered limited to what is shown in the drawings and described in the specification.

What is claimed is:

1. An optical metronome device comprising
a pair of rollers mounted on a supporting means,
a substantially opaque belt mounted for movement between said rollers,
non-opaque vertical line portions spaced on said belt,
lighting means positioned to shine through said non-opaque portions,
means for mounting a sheet positioned to receive light from said lighting means through said non-opaque portions,
and means to move said belt at a predetermined rate of speed.

2. The device of claim 1, further characterized by said means to move said belt being a motor connected to one of said pair of rollers.

3. The device of claim 1, further characterized by there being at least two of said non-opaque line portions spaced on said belt.

4. The device of claim 1, further characterized by said opaque belt being a continuous belt mounted on said pair of rollers.

5. The device of claim 1, further characterized by said lighting means including a lamp mounted behind a run of said belt,
and said lighting means further including a reflector behind said lamp.

6. The device of claim 1, further including
a sheet positioned in said mounting means, and having musical notations thereon,
said sheet being of translucent material to shine light therethrough from said non-opaque portions.

7. The device of claim 1, further characterized by said non-opaque portions being of transparent material.

* * * * *